United States Patent [19]

Chen

[11] Patent Number: 5,325,593
[45] Date of Patent: Jul. 5, 1994

[54] DOUBLE-BLADE PEELER

[76] Inventor: Ming-Jing Chen, No. 3, Alley 55, Lane 352, Chye Dong Load, Ah Yi Li, Changhua, Taiwan

[21] Appl. No.: 64,455

[22] Filed: May 21, 1993

[51] Int. Cl.⁵ .......................... A47J 17/02; B26B 3/00
[52] U.S. Cl. ...................... 30/279.6; 30/279.2; 30/340; 30/304
[58] Field of Search ............... 30/294, 293, 289, 287, 30/280, 279.6, 253, 236, 234, 353, 342, 341-90.4, 172, 278, 279.2, 279.4, 283, 340, 30; 99/541, 584, 588, 591; D7/693, 695

[56] References Cited

U.S. PATENT DOCUMENTS

| D. 139,352 | 11/1944 | Senkewitz | D7/695 |
| 354,378 | 12/1886 | Bills et al. | 30/236 |
| 415,216 | 11/1889 | McDonough | 30/253 |
| 849,252 | 4/1907 | Lipscomb | 30/236 |
| 2,232,315 | 2/1941 | Craig | 30/236 |
| 2,269,764 | 1/1942 | Gutman | 30/234 |
| 3,548,496 | 12/1970 | Van Hook | 30/253 |
| 3,608,196 | 9/1971 | Wiss | 30/253 |

Primary Examiner—Rinaldi I. Rada
Assistant Examiner—Clark F. Dexter
Attorney, Agent, or Firm—Morton J. Rosenberg; David I. Klein

[57] ABSTRACT

A double-blade peeler includes two elongated, arched handles joined at one end by a pin and retained in an open position by a spring, and two cutter blades respectively fastened to the handles on an inner side by respective threaded rods. The tension of the cutter blade is adjusted by turning the respective threaded rod in either direction.

2 Claims, 3 Drawing Sheets

DOUBLE-BLADE PEELER

BACKGROUND OF THE INVENTION

The present invention relates to a double-blade peeler which comprises two handles joined at one end and biased by a spring therebetween, and two cutter blades, each blade being respectively fastened to a handle on an inner side thereof.

Various fruits and vegetables must be properly peeled before eating or cooking. People may use a knife to remove the outer skin of a fruit or vegetable. While cutting, the fingers may be injured by the sharp edge of the knife. Further, using a knife to peel a fruit or the like cannot remove the outer skin in a uniform thickness. FIG. 1 shows a prior art peeler for peeling fruits and vegetables which eliminates the aforesaid problems. The peeler comprises a handle having a forked front end formed into two supports, and a cutter blade having two projecting portions on two opposite ends thereof, respectively disposed within a respective hole formed in each support. The outer skin of a fruit or the like is removed by moving the middle cutting edge of the cutter blade over the fruit or the like. Because the peeler has only one cutter blade, the peeling speed is limited.

SUMMARY OF THE INVENTION

The principal objection of the present invention is to provide a double-blade peeler which uses two opposing cutter blades for removing the outer skin from a fruit or vegetable efficiently. It is another object of the present invention to provide a double-blade peeler which is safe in use. It is still another object of the present invention to provide a double-blade peeler which can be conveniently adjusted to change the tightness with which the cutter blades are secured to the handle according to the thickness of the outer skin of the fruit or vegetable to be removed.

DETAILED DESCRIPTION OF THE PREFERRED EMBODIMENT

Figure 1:
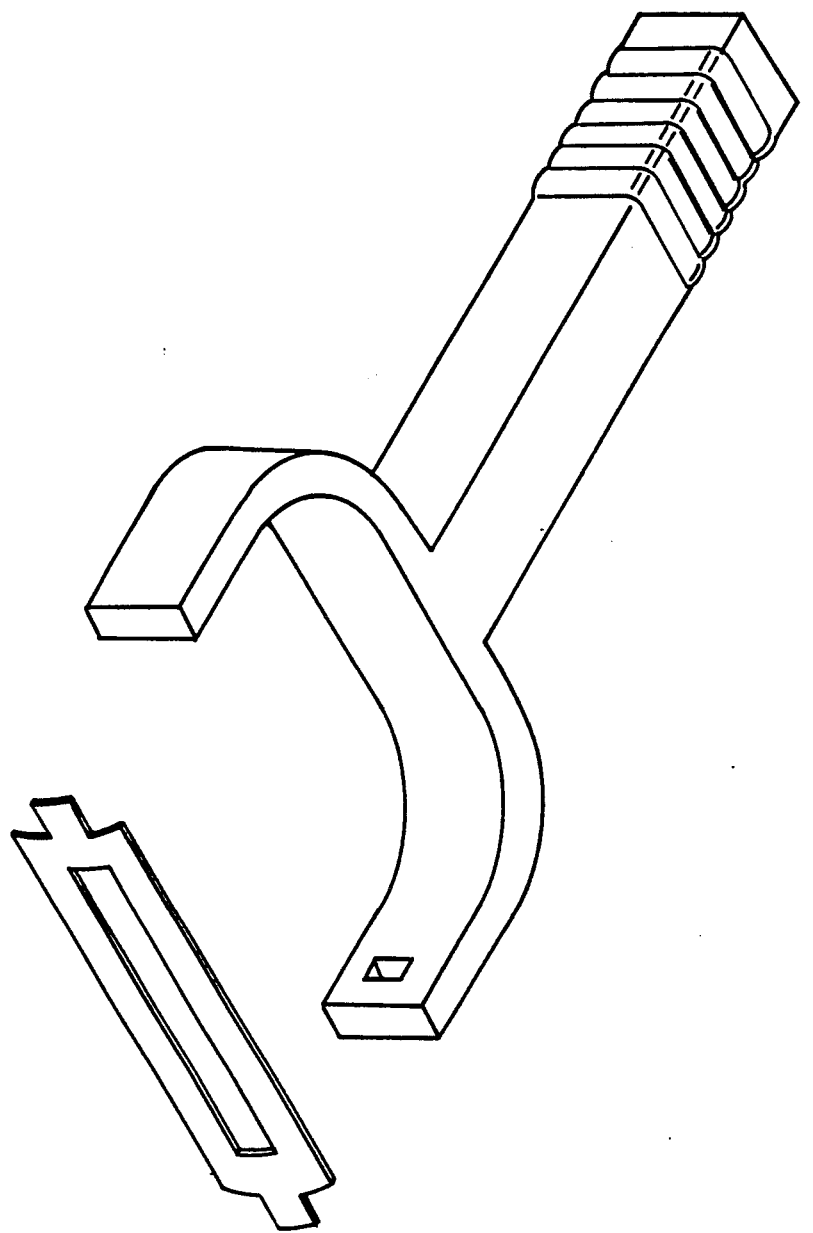
FIG. 1 is a perspective dismantled view of a peeler according to the prior art.
Figure 2:
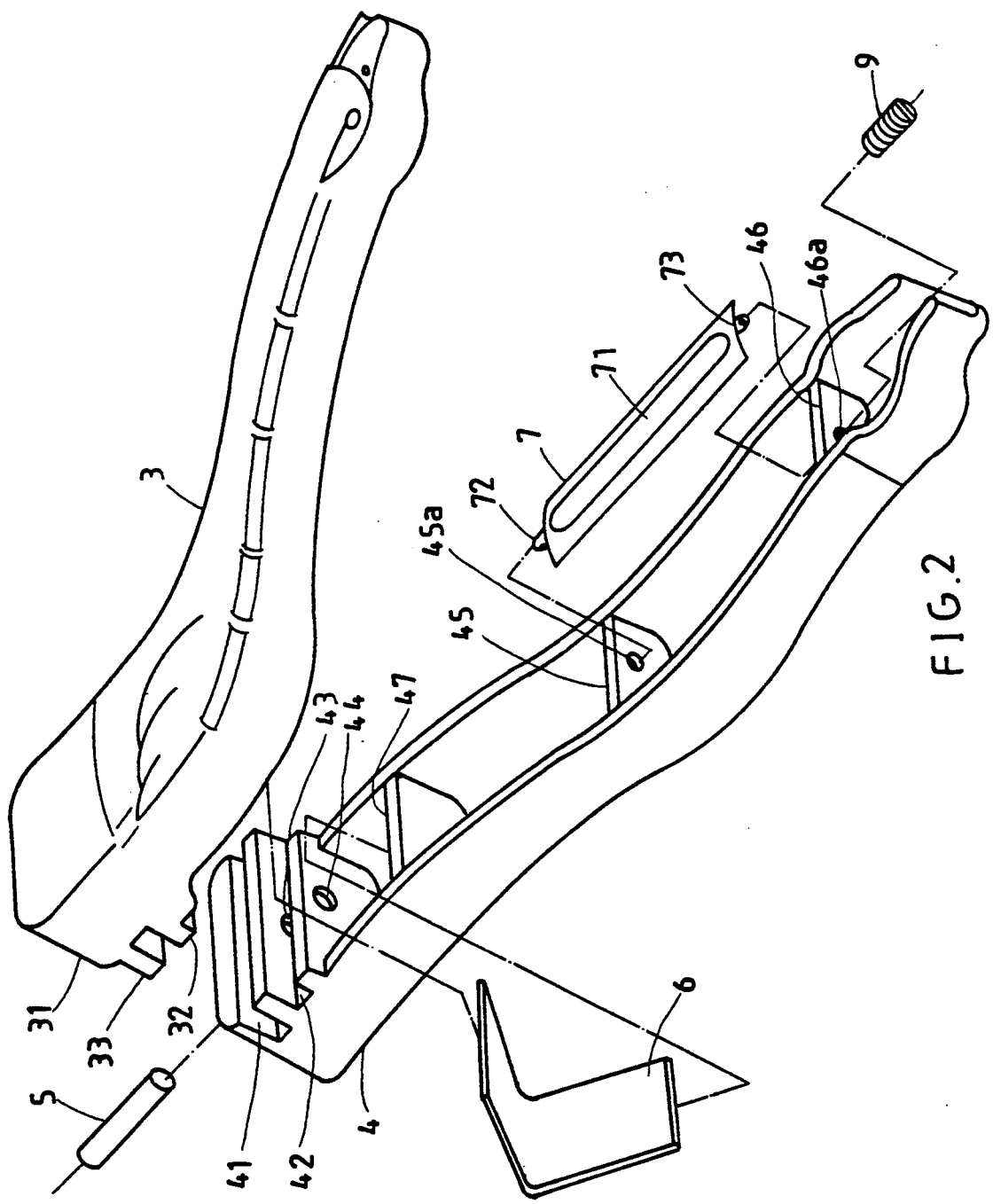
FIG. 2 is a perspective exploded view of a double-blade peeler according to the preferred embodiment of the present invention; and, FIG. 3 is a sectional front view of the double-blade peeler of FIG. 2.
Figure 3:
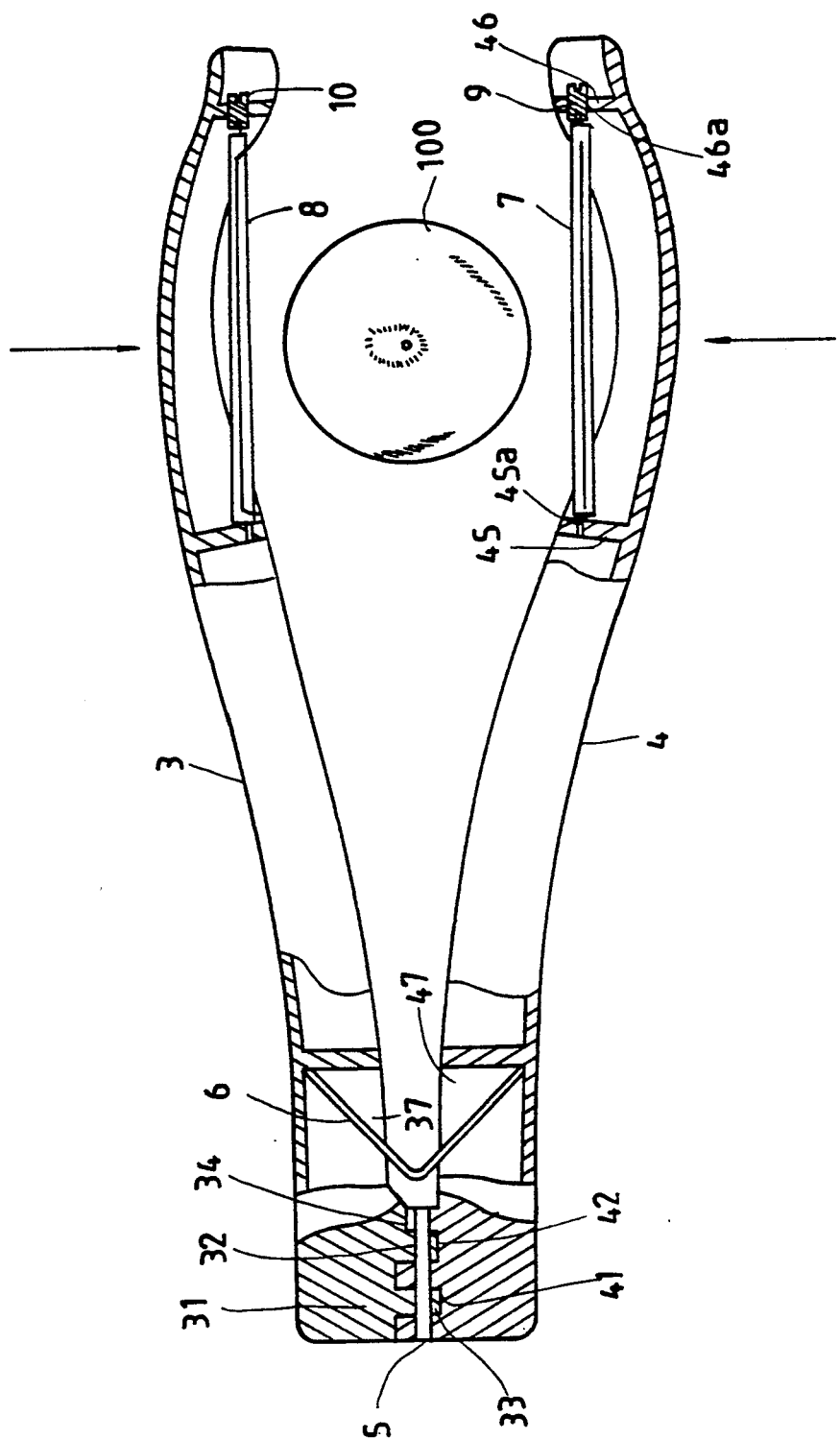

Referring to FIGS. 2 and 3, a double-blade peeler in accordance with the present invention is generally comprises of two handles 3 and 4 joined at one end by a pin 5. A spring 6 is retained between the handles 3 and 4 to support them in an open position, and two cutter blades 7 and 8 are fastened to respective handles 3, 4 on the inside thereof, for stripping the outer skin from a fruit 100 or the like. The handles 3 and 4 are respectively formed with a hollow structure, each having a shorter rear end terminated in a short flat portion, and a longer front end made in the shape of an arch. Handle 3 comprises a pair of parallel tongues 31 and 32 raised from the short flat portion thereof in a transverse direction, with pin holes 33, 34 (FIG. 3) formed through the parallel tongues 31 and 32 respectively, and aligned in the longitudinal direction. The other handle 4 comprises offset parallel tongues forming parallel grooves 41 and 42 on the short flat portion thereof, in the transverse direction, and with pin holes 43 and 44 longitudinally aligned through the offset parallel tongues of handle 4. As the parallel tongues 31 and 32 are respectively engaged within the parallel grooves 41 and 42, the pin holes on the handles 3 and 4 are aligned for insertion of the pin 5 therein. The handles 3 and 4 are otherwise symmetrically formed. Each handle 3, 4 comprises a rear chamber 47 near the respective short flat portion, which holds a respective end of the spring 6. Two partition walls are formed within the front portion of each handle, an inner partition wall 45 and an outer partition wall 46 disposed in spaced relation on the respective longer front end. Partition wall 45 has a through hole 45a formed therein. The other partition wall 46 has a threaded hole 46a longitudinally aligned with the through hole 45a. The cutter blades 7, 8 are made from an elongated metal plate, each having a pin 72 at one end fitted into the through hole 45a on the inner partition wall 45 and a pin 73 at the opposing end disposed within a recess formed in a threaded rod 9, 10 which is screwed into the threaded hole 46a. By turning the threaded respective rod 9, 10 in either direction, the tightness with which the respective cutter blade 7, 8 is secured to the respective handle is adjusted. The cutting edge of the cutter blade 7, 8 is formed around an elongated central opening 71 formed therethrough.

By squeezing the handles 3 and 4 toward each other, the cutter blades 7 and 8 are closely positioned against the fruit 100 to be peeled, and then the outer skin of the fruit is removed as the fruit is rotated between the cutter blades 7, 8. Because the cutter blades 7 and 8 are each disposed on the interior of a respective handle 3, 4, the double-blade peeler is safe in use.

What is claimed is:

1. A double-blade peeler comprising:
a pair of longitudinally extended blade members, each of said blade members having opposing longitudinal ends and a pair of pivot pins, each pin extending from one of said longitudinal ends respectively, each of said blade members having a centrally disposed elongated through opening formed therethrough and extending longitudinally, each of said blade members having a pair of cutting edges, each edge forming an opposing longitudinally extending side of said elongated through opening;
a first and second longitudinally extending handle member, each of said first and second of handle members having an arcuately shaped frontal portion defined by longitudinally extending upper wall and a pair of integrally formed longitudinally extending opposing side walls, each of said first and second handle members having at least a pair of transversely directed tongues extending in spaced parallel relation each from the other formed on a rear portion of said handle members and a pair of adjacent recess openings formed between said tongues, each of said tongues having a longitudinally directed through opening formed therein, said tongues and said pair recesses of said first handle member being offset with respect to said tongues and said recesses of said second handle member for respective coupling of each of said tongues of one handle member within one of respective recesses of said other handle member with each of said longitudinally directed through openings being disposed in a longitudinally aligned relation, each of said first and second handle members having a first partition and a longitudinally displaced second partition respectively, each of said first and second partitions being disposed transversely in said arcuately shaped frontal portion and extending between said opposing side walls, each of said first and second partitions having a respective longitudinally directed through bore formed therethrough;

a pin member secured within said longitudinally aligned through openings of each of said tongues for lockingly securing said rear portion of said first handle member to said rear portion of said second handle member; and, a pair of threaded rod members, each of said threaded rod members having a recess formed in one end thereof and being threadedly coupled within said through bore in one of said partitions of one of said first and second handle members, respectively whereby each of said blade members is pivotally coupled about a longitudinal axis between said first and second partitions of the respective first and second handle members, each of said blade members having a first one of said pivot pins disposed in said through bore of the other of said partitions and a second one of said pivot pins disposed in said recess of said respective threaded rod, wherein the tightness with which each of said blade members is secured in the respective handle member is adjustable by rotation of the respective threaded rod.

2. The double-blade peeler as recited in claim 1 further comprising a spring member mounted between said handle members with opposing ends of the spring members with said first and second handle members adjacent said respective rear portions of each of said first and second handle members for applying a biasing force therebetween.

* * * * *